United States Patent
Yamamoto

(10) Patent No.: US 9,576,304 B2
(45) Date of Patent: Feb. 21, 2017

(54) EVALUATION INFORMATION IDENTIFYING DEVICE, EVALUATION INFORMATION IDENTIFYING METHOD, EVALUATION INFORMATION IDENTIFYING PROGRAM, AND COMPUTER READABLE RECORDING MEDIUM FOR RECORDING THE PROGRAM

(75) Inventor: Tadahiro Yamamoto, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 63 days.

(21) Appl. No.: 13/702,496

(22) PCT Filed: Mar. 2, 2012

(86) PCT No.: PCT/JP2012/055469
§ 371 (c)(1),
(2), (4) Date: Dec. 6, 2012

(87) PCT Pub. No.: WO2013/001855
PCT Pub. Date: Jan. 3, 2013

(65) Prior Publication Data
US 2014/0172743 A1   Jun. 19, 2014

(30) Foreign Application Priority Data
Jun. 30, 2011   (JP) ................................ 2011-145909

(51) Int. Cl.
G06Q 30/02   (2012.01)
G06Q 10/06   (2012.01)
G06Q 30/06   (2012.01)

(52) U.S. Cl.
CPC ...... G06Q 30/0282 (2013.01); G06Q 30/0278 (2013.01); G06Q 30/0631 (2013.01)

(58) Field of Classification Search
CPC .................................................. G06Q 30/0282
(Continued)

(56) References Cited

U.S. PATENT DOCUMENTS 7,519,562 B1 *   4/2009   Vander Mey et al. ........ 705/500
7,657,458 B2 *   2/2010   Calabria .................... 705/26.61
(Continued)

FOREIGN PATENT DOCUMENTS

JP   2003-167990 A   6/2003

OTHER PUBLICATIONS

Ott et al., "Finding Deceptive Opinion Spam by Any Stretch of the Imagination," Proceedings of the 49th Annual Meeting of the Association for the Computational Linguistics, pp. 309-319, Jun. 19-24, 2011.*

(Continued)

Primary Examiner — Jonathan Ouellette
(74) Attorney, Agent, or Firm — Sughrue Mion, PLLC

(57) ABSTRACT

An evaluation information identifying device includes an extracting unit that, when, as a result of determining the presence or absence of a correlation between a supplier of an evaluation target and an evaluator having made a positive evaluation on the evaluation target, it is determined that there is a correlation, extracts evaluation information posted by the evaluator on the evaluation target provided by the supplier as specific evaluation information, and an outputting unit that performs specified processing based on the extracted specific evaluation information. It is thereby determined whether the possibility that the evaluator is an interested party to the supplier is high or low, and the evaluation information by an interested party to the evaluation target or the like is identified. It is thereby possible to provide useful evaluation information.

14 Claims, 13 Drawing Sheets

(58) Field of Classification Search
USPC .......................................... 705/1.1–912, 347
See application file for complete search history.

(56) References Cited

U.S. PATENT DOCUMENTS

| | | | |
|---|---|---|---|
| 7,752,081 B2 * | 7/2010 | Calabria | 705/26.1 |
| 7,761,343 B2 * | 7/2010 | Calabria | 705/26.1 |
| 7,822,646 B2 * | 10/2010 | Calabria | 705/26.1 |
| 7,899,875 B1 * | 3/2011 | Gall et al. | 709/206 |
| 8,019,743 B2 * | 9/2011 | Ebanks | 707/706 |
| 8,447,643 B2 * | 5/2013 | Barnes, Jr. | 705/7.29 |
| 2003/0105668 A1 | 6/2003 | Segawa et al. | |
| 2008/0114748 A1 | 5/2008 | Varner | |
| 2008/0270389 A1 | 10/2008 | Jones et al. | |
| 2009/0292548 A1 | 11/2009 | Van Court | |
| 2009/0327181 A1 | 12/2009 | Lee et al. | |

OTHER PUBLICATIONS

European Patent Office, European Search Report issued in corresponding EP Application No. 12794160.7, dated Nov. 22, 2013.
Translation of International Preliminary Report on Patentability dated Jan. 16, 2014 issued in Application No. PCTJP2012055469.
Canadian Office Action dated Jun. 6, 2013, issued in Canadian Patent Application No. 2,796,493.
Translation of International Preliminary Report on Patentability dated Apr. 13, 2012 issued in Application No. PCT/JP2012/055469.

* cited by examiner

Fig.4

| REVIEW POSTER (USER ID) | REVIEW | REVIEW TARGET (PRODUCT ID) | REVIEW CONTENTS (EVALUATION VALUE) | POSTED TIME | REVIEW EVALUATOR | EVALUATION CONTENTS | EVALUATION TIME |
|---|---|---|---|---|---|---|---|
| AAA | R1 | M1 | 5 | T<sub>A1</sub> | BBB | N | T<sub>B1</sub> |
| | | | | | CCC | P | T<sub>B2</sub> |
| | | | | | DDD | P | T<sub>B3</sub> |
| | | | | | FFF | N | T<sub>B4</sub> |
| | | | | | EEE | N | T<sub>B5</sub> |
| | | | | | .. | .. | .. |
| | R2 | M2 | 5 | T<sub>A2</sub> | CCC | P | T<sub>B6</sub> |
| | | | | | BBB | N | T<sub>B7</sub> |
| | | | | | DDD | P | T<sub>B8</sub> |
| | | | | | EEE | N | T<sub>B9</sub> |
| | | | | | .. | .. | .. |
| | R3 | M4 | 5 | T<sub>A3</sub> | CCC | P | T<sub>B10</sub> |
| | | | | | FFF | N | T<sub>B11</sub> |
| | .. | .. | .. | .. | .. | .. | .. |
| BBB | R4 | M1 | 3 | T<sub>A4</sub> | EEE | P | T<sub>B12</sub> |
| | | | | | FFF | P | T<sub>B13</sub> |
| | | | | | GGG | N | T<sub>B14</sub> |
| | R5 | M3 | 2 | T<sub>A5</sub> | .. | .. | .. |
| | .. | .. | .. | .. | .. | .. | .. |
| CCC | R6 | M1 | 5 | T<sub>A6</sub> | DDD | P | T<sub>B15</sub> |
| | R7 | M4 | 5 | T<sub>A7</sub> | .. | .. | .. |
| | .. | .. | .. | .. | | | |
| .. | | | | | | | |

*Fig.5*

| PRODUCT ID | ATTRIBUTE INFORMATION | | |
|---|---|---|---|
| | SHOP ID | MANUFACTURER ID | ... |
| M1 | Sh1 | K1 | ... |
| M2 | Sh1 | K2 | ... |
| M3 | Sh2 | K1 | ... |
| M4 | Sh1 | K3 | ... |
| M5 | Sh3 | K1 | ... |
| M6 | Sh2 | K2 | ... |
| ⋮ | ⋮ | ⋮ | ⋮ |

*Fig.9*

| USER ID | POINT |
|---------|-------|
| AAA | $P_1$ |
| BBB | $P_2$ |
| CCC | $P_3$ |
| : | : |

EVALUATION INFORMATION IDENTIFYING DEVICE, EVALUATION INFORMATION IDENTIFYING METHOD, EVALUATION INFORMATION IDENTIFYING PROGRAM, AND COMPUTER READABLE RECORDING MEDIUM FOR RECORDING THE PROGRAM

CROSS REFERENCE TO RELATED APPLICATIONS

This application is a National Stage of International Application No. PCT/JP2012/055469 filed Mar. 2, 2012, claiming priority based on Japanese Patent Application No. 2011-145909, filed Jun. 30, 2011, the contents of all of which are incorporated herein by reference in their entirety.

TECHNICAL FIELD

The present invention relates to an evaluation information identifying device, an evaluation information identifying method, an evaluation information identifying program, and a computer readable recording medium for recording the program.

BACKGROUND ART

In an existing electronic commerce site, posting of reviews including comments and feedback on products or the like is accepted, and the accepted reviews are shown to users. For example, a system that allows posting of an article about a product in an electronic commerce site is disclosed in the following Patent Literature 1. Further, a site configured to accept evaluations on the presented reviews is also known.

CITATION LIST

Patent Literature

PTL 1: Japanese Unexamined Patent Application Publication No. 2003-167990

SUMMARY OF INVENTION

Technical Problem

When a certain user is thinking about purchasing a product or the like, reviews which are evaluation information for the product that have been posted by other users are useful as reference information. Further, evaluations on the posted reviews are also useful as information that evaluates the reliability of the reviews. However, there are cases where positive reviews are posted by an interested party to a certain product or the like for the purpose of enhancing the evaluation of the product or the like for the public. Further, there are cases where positive evaluations on the posted review are posted by an interested party to the person who has posted the review for the purpose of enhancing the reliability of the review. Because evaluations by an interested party to an evaluation target are not fair, they are not useful for users.

In view of the foregoing, an object of the present invention is to provide an evaluation information identifying device, an evaluation information identifying method, an evaluation information identifying program, and a computer readable recording medium for recording the program that can identify evaluation information by an interested party to an evaluation target or the like.

Solution to Problem

To solve the above problem, an evaluation information identifying device according to one aspect of the present invention includes a determining means for setting a first correlation determination condition that, based on a plurality of evaluation information containing evaluations by evaluators on an evaluation target provided by a supplier and posted for the evaluation target, when a proportion of a number of evaluation information containing positive evaluations to a number of evaluation information by one evaluator on a plurality of evaluation targets provided by one supplier is a specified percentage or more, it is determined that there is a correlation between the one supplier and the one evaluator, and determining presence or absence of a correlation between a supplier and an evaluator based on the first correlation determination condition; an extracting means for setting a first extraction condition that, when it is determined by the determining means that there is a correlation between the supplier and the evaluator based on the first correlation determination condition, evaluation information corresponds to evaluation information by the evaluator on the evaluation target provided by the supplier, and extracting the evaluation information corresponding to the first extraction condition as specific evaluation information; and an outputting means for performing specified processing based on the specific evaluation information extracted by the extracting means.

An evaluation information identifying method according to one aspect of the present invention is an evaluation information identifying method performed by an evaluation information identifying device, the method including a determining step of setting a first correlation determination condition that, based on a plurality of evaluation information containing evaluations by evaluators on an evaluation target provided by a supplier and posted for the evaluation target, when a proportion of a number of evaluation information containing positive evaluations to a number of evaluation information by one evaluator on a plurality of evaluation targets provided by one supplier is a specified percentage or more, it is determined that there is a correlation between the one supplier and the one evaluator, and determining presence or absence of a correlation between a supplier and an evaluator based on the first correlation determination condition; an extracting step of setting a first extraction condition that, when it is determined in the determining step that there is a correlation between the supplier and the evaluator based on the first correlation determination condition, evaluation information corresponds to evaluation information by the evaluator on the evaluation target provided by the supplier, and extracting the evaluation information corresponding to the first extraction condition as specific evaluation information; and an outputting step of performing specified processing based on the specific evaluation information extracted in the extracting step.

An evaluation information identifying program according to one aspect of the present invention is a evaluation information identifying program causing a computer to function as an evaluation information identifying device, the program causing the computer to implement a determining function for setting a first correlation determination condition that, based on a plurality of evaluation information containing evaluations by evaluators on an evaluation target provided by a supplier and posted for the evaluation target, when a proportion of a number of evaluation information containing positive evaluations to a number of evaluation information by one evaluator on a plurality of evaluation targets provided by one supplier is a specified percentage or more, it is determined that there is a correlation between the one supplier and the one evaluator, and determining presence or absence of a correlation between a supplier and an evaluator based on the first correlation determination condition; an extracting function for setting a first extraction condition that, when it is determined by the determining function that there is a correlation between the supplier and the evaluator based on the first correlation determination condition, evaluation information corresponds to evaluation information by the evaluator on the evaluation target provided by the supplier, and extracting the evaluation information corresponding to the first extraction condition as specific evaluation information; and an outputting function for performing specified processing based on the specific evaluation information extracted by the extracting function.

A computer readable recording medium according to one aspect of the present invention is a computer readable recording medium for recording an evaluation information identifying program causing a computer to function as an evaluation information identifying device, the evaluation information identifying program causing the computer to implement a determining function for setting a first correlation determination condition that, based on a plurality of evaluation information containing evaluations by evaluators on an evaluation target provided by a supplier and posted for the evaluation target, when a proportion of a number of evaluation information containing positive evaluations to a number of evaluation information by one evaluator on a plurality of evaluation targets provided by one supplier is a specified percentage or more, it is determined that there is a correlation between the one supplier and the one evaluator, and determining presence or absence of a correlation between a supplier and an evaluator based on the first correlation determination condition; an extracting function for setting a first extraction condition that, when it is determined by the determining function that there is a correlation between the supplier and the evaluator based on the first correlation determination condition, evaluation information corresponds to evaluation information by the evaluator on the evaluation target provided by the supplier, and extracting the evaluation information corresponding to the first extraction condition as specific evaluation information; and an outputting function for performing specified processing based on the specific evaluation information extracted by the extracting function.

In the above aspect, because the presence or absence of a correlation between a supplier of an evaluation target and an evaluator who has made an positive evaluation on the evaluation target is determined, whether the possibility that the evaluator is an interested party to the supplier is high or low is determined. Then, when it is determined that there is a correlation, the evaluation information posted by the evaluator on the evaluation target provided by the supplier is extracted as the specific evaluation information, and specified processing based on the extracted specific evaluation information is executed, and therefore the evaluation information by an interested party to the evaluation target or the like is identified. It is thereby possible to provide useful evaluation information.

In the evaluation information identifying device according another aspect, the determining means may set a second correlation determination condition that, when a number of evaluation information containing positive evaluations on one evaluation target posted within a specified period of time from a reference time related to the evaluation target is a specified number or more, it is determined that there is a correlation between a supplier of the one evaluation target and an evaluator of the positive evaluation information, and determine presence or absence of a correlation between a supplier and an evaluator based on the second correlation determination condition, and the extracting means may set a second extraction condition that, when it is determined by the determining means that there is a correlation between the supplier and the evaluator based on the second correlation determination condition, evaluation information corresponds to evaluation information by the evaluator on the evaluation target provided by the supplier, and extract the evaluation information further corresponding to the second extraction condition as the specific evaluation information.

Because the posting of evaluation information by an interested party or the like tends to concentrate on a certain period immediately after a specified reference time such as the sale date of an evaluation target or the time when evaluations on an evaluation target are set available, for example, the evaluation information by an interested party or the like can be appropriately extracted in the above aspect.

In the evaluation information identifying device according another aspect, the evaluation information may contain information about a posted time, when evaluation information having been posted before the posted time of one evaluation information by an evaluator of the one evaluation information is not contained in the plurality of evaluation information, the determining means may determine that the one evaluation information is evaluation information posted for the first time by the evaluator, the determining means may set a third correlation determination condition that, when a proportion of evaluation information posted for the first time by an evaluator to a plurality of evaluation information posted for one evaluation target is a specified percentage or more, it is determined that there is a correlation between a supplier of the one evaluation target and the evaluator of the evaluation information posted for the first time, and determine presence or absence of a correlation between a supplier and an evaluator based on the third correlation determination condition, and the extracting means may set a third extraction condition that, when it is determined by the determining means that there is a correlation between the supplier and the evaluator based on the third correlation determination condition, evaluation information corresponds to evaluation information by the evaluator on the evaluation target provided by the supplier, and extract the evaluation information further corresponding to the third extraction condition as the specific evaluation information.

Because an interested party or the like to an evaluation target tends to not make any evaluations on the other evaluation targets with the only aim of posting positive evaluations on the evaluation target, the evaluation information by an interested party or the like can be accurately extracted in the above aspect.

In the evaluation information identifying device according another aspect, the determining means may set a third correlation determination condition that, when a proportion of evaluation information posted for the first time by an evaluator and posted within a specified period of time from date and time when posting of evaluation information by the evaluator becomes available to a plurality of evaluation information posted for one evaluation target is a specified percentage or more, it is determined that there is a correlation between a supplier of the one evaluation target and the evaluator of the evaluation information posted for the first time.

Because an interested party tends to obtain the right or qualification to post evaluation information with the only aim of posting positive evaluations on the evaluation target, the evaluation information by an interested party or the like can be extracted more accurately in the above aspect. The date and time when the posting of evaluation information becomes available may be the time when a user ID for posting is acquired, for example.

In the evaluation information identifying device according another aspect, the determining means may set a first correlation determination condition that, when a proportion of a number of evaluation information containing positive evaluations to a number of evaluation information by one evaluator on a plurality of evaluation targets provided by one supplier is a specified percentage or more and the number of evaluation information containing positive evaluations is a specified number or more, it is determined that there is a correlation between the one supplier and the one evaluator.

In this aspect, a correlation between a supplier of an evaluation target and an evaluator can be appropriately determined.

In the evaluation information identifying device according another aspect, when a specified number or more of evaluation information are posted by the evaluator for evaluation targets provided by suppliers other than the supplier, the determining means may determine that there is no correlation between the supplier and the evaluator.

Even if an evaluator is determined to have a correlation with a supplier of an evaluation target, the evaluator who has posted evaluation information on evaluation targets by suppliers other than the supplier is likely to be not an interested party to the supplier. In such a case, it is possible to prevent the evaluation information by the evaluator from being extracted as the specific evaluation information by an interested party.

In the evaluation information identifying device according another aspect, the specific evaluation information may be extracted on condition that the evaluation target is a specified product or service, the evaluation information is a review containing an evaluation on the specified product or service, and the evaluator is a review poster having posted the review.

In this aspect, reviews posted by an interested party to a supplier of a specified product or service for the product or the like are appropriately extracted. Note that the specified product or the like may be a product or the like provided on an electronic commerce site, for example.

In the evaluation information identifying device according another aspect, the specific evaluation information may be extracted on condition that the evaluation target is a review posted for a specified product or service, the supplier of the evaluation target is a review poster having posted the review, the evaluation information is information containing a review evaluation on the review, and the evaluator is a poster of the review evaluation.

In this aspect, review evaluations on reviews by an interested party to a review poster of the reviews on a specified product or service are appropriately extracted.

In the evaluation information identifying device according another aspect, the evaluation target may be a specified product or service, the evaluation information may be a review evaluation on a review posted for the evaluation target, the evaluator may be a poster of the review evaluation, and the determining means may set a first correlation determination condition that, when a proportion of a number of evaluation information containing positive evaluations to a number of evaluation information by one evaluator on reviews containing positive evaluations for one or more evaluation targets provided by one supplier is a specified percentage or more, it is determined that there is a correlation between the one supplier and the one evaluator.

Positive review evaluations on positive reviews for an evaluation target can be regarded as the evaluation information that positively evaluates the evaluation target in an indirect manner. In the above aspect, when the proportion of the number of positive review evaluations by one evaluator posted for positive reviews on evaluation targets provided by one supplier to the number of review evaluations by the one evaluator posted for positive reviews on evaluation targets provided by the one supplier is a specified percentage or more, it is determined that there is a correlation between the one supplier and the one evaluator, and it is thereby possible to determine whether the possibility that the evaluator is an interested party to the supplier is high or low.

In the evaluation information identifying device according another aspect, the outputting means may display the specific evaluation information extracted by the extracting means on a specified display means so as to be distinguishable from evaluation information other than the specific evaluation information.

In this aspect, evaluation information by an interested party to a supplier of an evaluation target can be easily recognized.

In the evaluation information identifying device according another aspect, the outputting means may display a proportion of a number of the specific evaluation information to a number of evaluation information posted for one evaluation target on the specified display means.

In this aspect, the proportion of evaluation information by an interested party to evaluation information on one evaluation target can be easily recognized.

The evaluation information identifying device according another aspect may further include a compiling means for giving points to an evaluator of evaluation information based on a number of posted evaluation information and a level of evaluation on the evaluation information, and the output means may cause the compiling means to give points in accordance with a proportion of a number of the specific evaluation information to a number of evaluation information posted for one evaluation target to an evaluator having posted evaluation information on the one evaluation target.

In this embodiment, it is possible to promote the posting of evaluation information by those who are not an interested party to an evaluation target by giving points as incentives and thereby enhance the reliability of the evaluation information on the evaluation target.

The evaluation information identifying device according another aspect may further include a compiling means for giving points to an evaluator of evaluation information based on a number of posted evaluation information and a level of evaluation on the evaluation information and outputting ranking of evaluators based on the points, and the output means may control points given to an evaluator of the specific evaluation information to be lower than points given to an evaluator of evaluation information other than the specific evaluation information, or exclude an evaluator of the specific evaluation information from compilation of the ranking.

In this embodiment, when evaluation information by an interested party to an evaluation target is posted, the points given to the interested party are controlled to be lower, or the interested party is excluded from the ranking, and consequently the reliability of the ranking of evaluators is enhanced.

Advantageous Effects of Invention

According to one aspect of the present invention, it is possible to identify evaluation information by an interested party to an evaluation target or the like.

BRIEF DESCRIPTION OF DRAWINGS

FIG. 4 is a diagram showing a configuration of a review history storage unit and an example of data stored therein.

FIG. 5 is a diagram showing a structure of a review target attribute information table included in a review history storage unit and an example of data stored therein.

FIG. 9 is a diagram showing an example of a point table that stores points in association with users in a poster point compiling unit.

DESCRIPTION OF EMBODIMENTS

Embodiments of the present invention will be described in detail with reference to the drawings. Note that, in the description of the drawings, the same or equivalent elements will be denoted by the same reference symbols and redundant description will be omitted.

Figure 1:
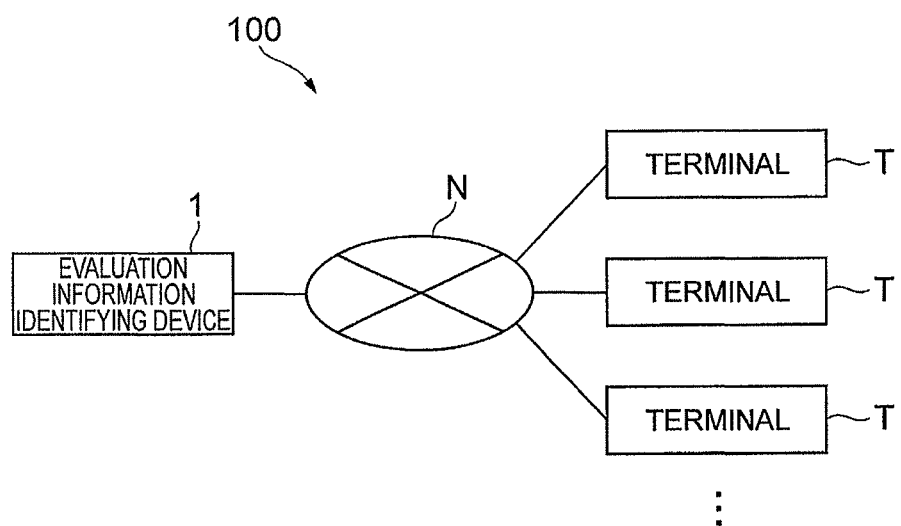
FIG. 1 is a diagram showing a device configuration of a system including an evaluation information identifying device.

FIG. 1 is a block diagram showing a device configuration of a system 100 that includes an evaluation information identifying device according to this embodiment. The system 100 includes an evaluation information identifying device 1 and a plurality of terminals T. The evaluation information identifying device 1 according to this embodiment is a device that accepts posting of evaluation information containing evaluations on an evaluation target from the terminal T and displays the accepted evaluation information for the terminal T. Specifically, the evaluation information identifying device 1 accepts reviews including comments and feedback on an evaluation target, which is a product or service provided on an electronic commerce site or the like, as evaluation information from users and shows the accepted reviews in association with the product or the like to users. The evaluation target such as a product or service is provided by a supplier such as a manufacturer or shop.

Note that, although a product or service on an electronic commerce site or the like serves as the evaluation target, the concept of the evaluation target is not limited to a product or service. For example, on a site that accepts reviews on works such as movies and books and shows the accepted reviews to users, movies and books serve as the evaluation target. Authors, writers, directors, distributing agencies, publishing companies and the like of movies and books are examples of the supplier of movies and books.

Further, the evaluation information identifying device 1 can accept review evaluations containing evaluations on the posted reviews as evaluation information. In this case, posted reviews and review posters serve as the evaluation target and its supplier. Review evaluation posters serve as an evaluator.

The evaluation information identifying device 1 and the user terminals T can communicate with one another through a communication network N that is the Internet, a wireless LAN, a mobile communication network or the like. The terminal T is a mobile terminal, a personal computer or the like, for example. Although three terminals T are shown in FIG. 1, the number of terminals in the system 100 is arbitrary.

Figure 2:
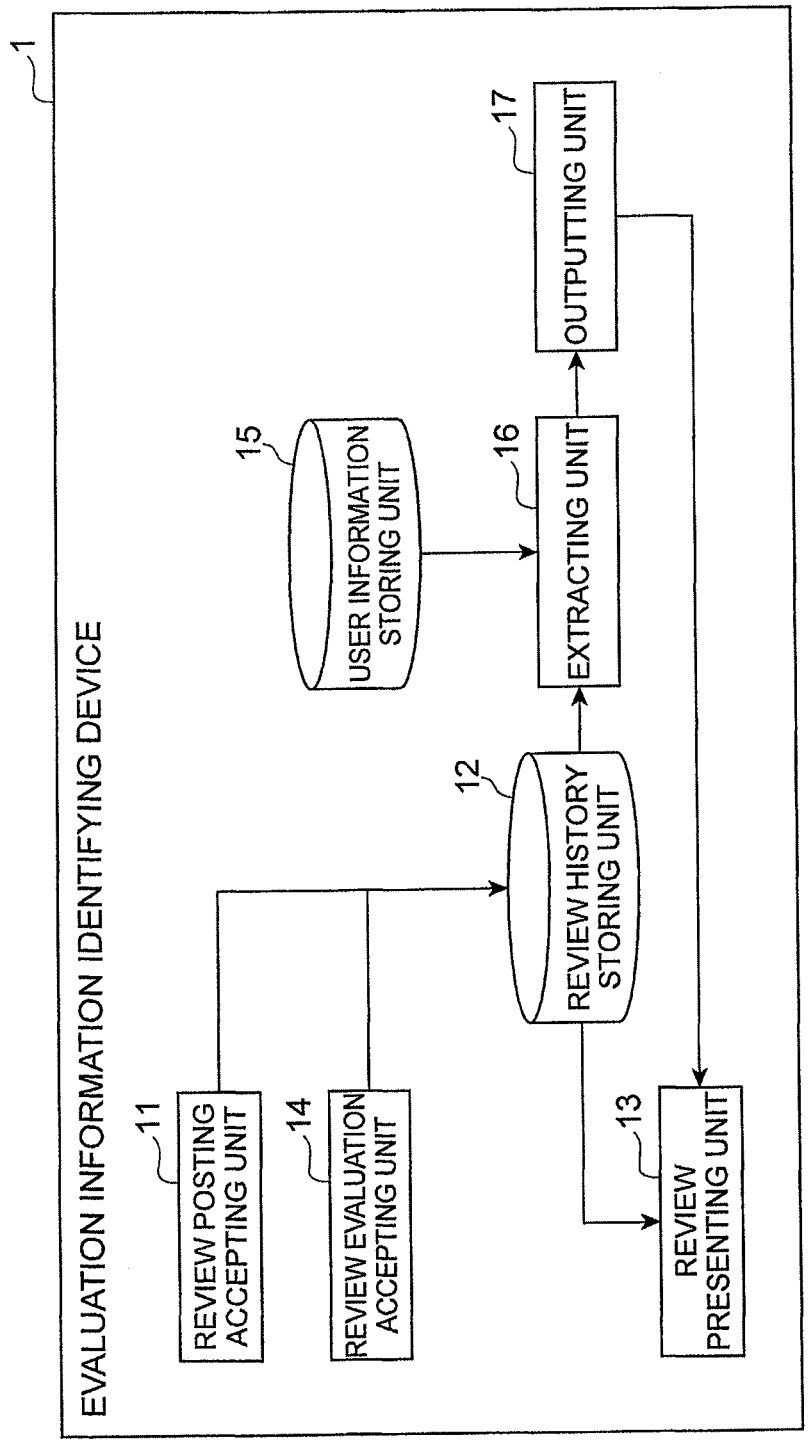
FIG. 2 is a block diagram showing a functional configuration of an evaluation information identifying device.

FIG. 2 is a block diagram showing the functional configuration of the evaluation information identifying device 1 according to this embodiment. As shown in FIG. 2, the evaluation information identifying device 1 includes, as functional components, a review posting accepting unit 11, a review history storing unit 12, a review presenting unit 13, a review evaluation accepting unit 14, a user information storing unit 15, an extracting unit 16 (determining means, extracting means), and an outputting unit 17 (outputting means). Note that, although the functional units 11 to 17 are incorporated in one device in this embodiment, the functional units 11 to 17 may be incorporated in separate devices that can communicate with one another. For example, the evaluation information identifying device 1 may be composed only of the extracting unit 16 and the outputting unit 17.

Figure 3:
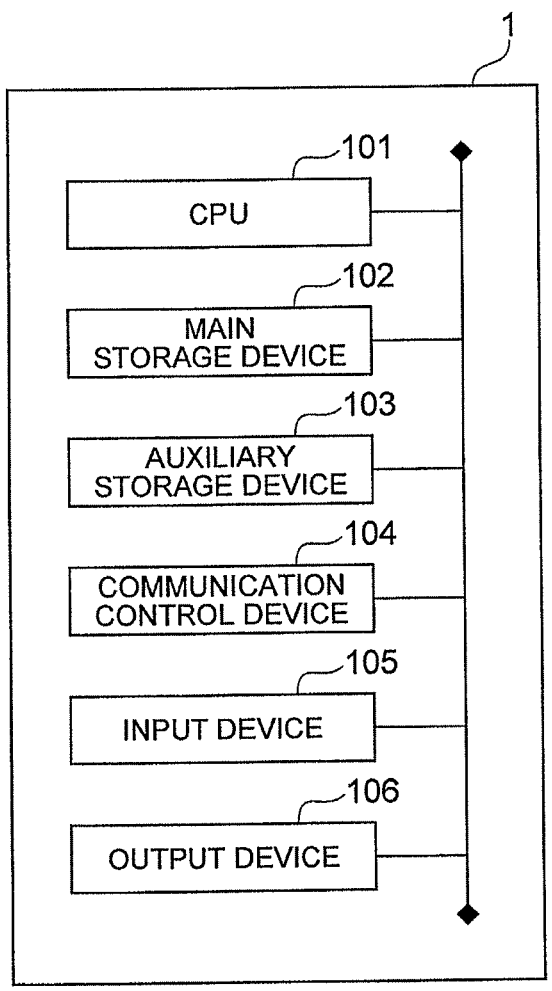
FIG. 3 is a diagram showing a hardware configuration of an evaluation information identifying device.

FIG. 3 is a hardware configuration diagram of the evaluation information identifying device 1. The evaluation information identifying device 1 is physically configured as a computer system that includes a CPU 101, a main storage device 102 such as memory like RAM and ROM, an auxiliary storage device 103 such as a hard disk, a communication control device 104 such as a network card, an input device 105 such as a keyboard and a mouse, an output device 106 such as a display and the like.

The functions shown in FIG. 2 are implemented by loading given computer software (evaluation information identifying program) onto hardware such as the CPU 101 or the main storage device 102, making the communication control device 104, the input device 105 and the output device 106 operate under control of the CPU 101, and performing reading and writing of data in the main storage device 102 or the auxiliary storage device 103. Data and database required for the processing is stored in the main storage device 102 or the auxiliary storage device 103.

The review posting accepting unit 11 is a part that accepts posting of reviews on products, services and the like serving as the evaluation target from the terminals T through the network N. The reviews can include text data representing user's comments and feedback on the evaluation target and numeric data representing the evaluation value of the evaluation target. The review posting accepting unit 11 stores the accepted reviews into the review history storing unit 12.

The review history storing unit 12 is a part that stores the contents of reviews and the like accepted by the review posting accepting unit 11. FIG. 4 is a diagram showing the configuration of the review history storing unit 12 and an example of data stored therein. As shown in FIG. 4, the review history storing unit 12 stores review ID, product ID, contents of review and posted time in association with each user ID for identifying a review poster. For example, the review identified by the review ID "R1" is associated with the user ID "AAA" and further associated with the product ID "M1" of the evaluation target of the review and the posted time "$T_{A1}$". The contents of review contain an evaluation value indicating the level of evaluation on the evaluation target. For example, the review identified by the review ID "R1" contains the evaluation value "5". In this embodiment, the evaluation value as the contents of review is represented by the score of 1 to 5 indicating the level of positive evaluation, it is not limited thereto. The evaluation value may be represented by two levels of positive and negative, for example. Further, the contents of review can contain text data and the like representing the contents of evaluation (not shown). Further, a phrase representing positive or negative evaluation may be extracted from text data representing the review contents by a technique like morphological analysis, for example, and an evaluation value indicating the level of evaluation may be set based on the extracted phrase. Further, the review history storing unit 12 stores, for each review, information related to review evaluations, which are evaluations on the review, as evaluation information on the posted review. The review evaluation is described later.

Further, the review history storing unit 12 may have a review target attribute information table in which attribute information of a product or the like as the evaluation target of reviews is stored together with the information about the history of posted reviews shown in FIG. 4. FIG. 5 is a diagram showing the structure of the review target attribute information table and an example of data stored therein. As shown in FIG. 5, the review target attribute information table stores attribute information in association with a product ID that identifies a product as the evaluation target of a review. The attribute information contains information related to a supplier of the product, for example, and may contain a shop ID that identifies a shop selling the product, a manufacturer ID that identifies a manufacturer of the product and the like, for example.

The review presenting unit 13 is a part that presents the contents of reviews accepted by the review posting accepting unit 11 to the terminals T. Specifically, the review presenting unit 13 transmits data for displaying the contents of reviews on a Web page or the like to the terminals T through the network N.

The review evaluation accepting unit 14 is a part that accepts review evaluations containing evaluations on the posted reviews as evaluation information from the terminals T. The review evaluation is information indicating the level of a positive or negative evaluation on a review as the evaluation target.

Figure 6:
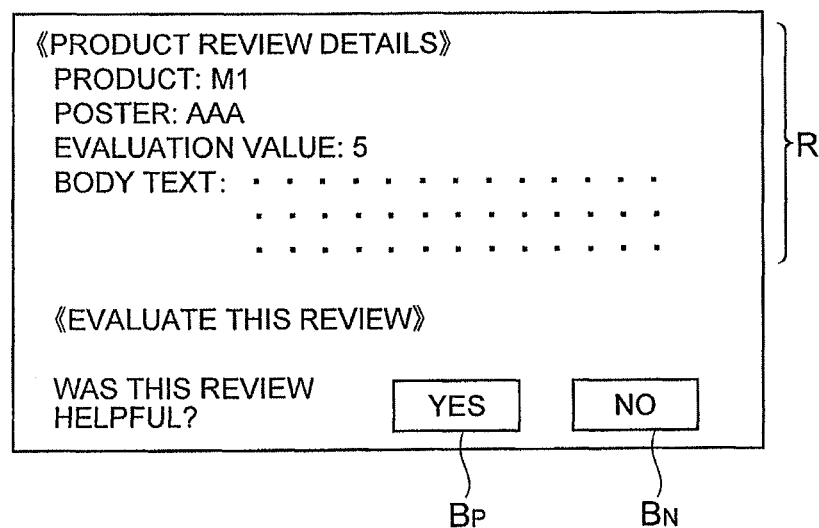
FIG. 6 is an example of a screen for receiving input of reviews and review evaluation information which is displayed on a terminal.

FIG. 6 is an example of a screen for receiving input of evaluation information that is displayed on the terminal T. In the screen example shown in FIG. 6, the review contents R transmitted from the review presenting unit 13 to the terminal T are shown, and a button $B_P$ for inputting a positive evaluation on the review and a button $B_N$ for inputting a negative evaluation on the review are placed. The review contents R include the product ID "M1" that identifies a product, the user ID "AAA" of a review poster, the evaluation value "5 points" as the review contents, and body text. When the button $B_P$ is operated in the terminal T, the review evaluation accepting unit 14 accepts the review evaluation containing a positive evaluation. On the other hand, when the button $B_N$ is operated in the terminal T, the review evaluation accepting unit 14 accepts the review evaluation containing a negative evaluation.

The review evaluation accepting unit 14 stores the accepted review evaluation in association with the review ID of the review as the evaluation target of the review evaluation into the review history storing unit 12. Referring back to FIG. 4, the review evaluation accepting unit 14 stores the user ID of a review evaluator, the contents of evaluation and the evaluation time as the review evaluation. The contents of evaluation are represented by data (P) indicating a positive evaluation or data (N) indicating a negative evaluation. Further, the evaluation time $T_B$ indicates a time when the review evaluation is accepted by the review evaluation accepting unit 14. For example, as the evaluation information on the review "R1", the review evaluation containing information such as the review evaluator "BBB", the evaluation contents "N" and the evaluation time "$T_{B1}$" is stored in FIG. 4. Note that, although the contents of evaluation indicate either one of two levels of evaluation, positive P or negative N, in the review evaluation in this embodiment, it is not limited thereto, and information indicating more levels of evaluation may be used. For example, the contents of evaluation may be a five-level score indicating the level of positive evaluations. The following description is based on the assumption that the contents of evaluation indicate either one of two levels of evaluation, positive P or negative N, in this embodiment.

The user information storing unit 15 is a storing means that stores the date and time when the posting of the evaluation information by an evaluator such as a review poster or a review evaluation poster becomes available for each user ID that identifies the evaluator. The date and time when the posting of the evaluation information becomes available is the acquisition date of a user ID to obtain authentication of access to a system that accepts the posting of reviews and review evaluations, for example.

The extracting unit 16 is a part that extracts the evaluation information that corresponds to a specified extraction condition as specific evaluation information based on a plurality of reviews containing evaluations on a specified evaluation target such as a product or service. The specific evaluation information extracted thereby is a review posted by an interested party to the product or item.

Specifically, the extracting unit 16 sets a first correlation determination condition that, based on a plurality of reviews that contain evaluations on products, services or the like provided by a supplier and that have been posted for the product or the like, when the proportion of the number of reviews containing positive evaluations to the number of reviews by one review poster on a plurality of products provided by one supplier is a specified percentage or more, it is determined that there is a correlation between one supplier and one review poster, and then determines the presence or absence of a correlation between a supplier and a review poster on the basis of the first correlation determination condition.

The extracting unit 16 can determine a correlation between a supplier and a review poster by referring to the review history information shown in FIG. 4 and the review target attribute information table shown in FIG. 5. Specifically, the extracting unit 16 compiles the number of reviews by the same review poster for one supplier for each poster. For example, the extracting unit 16 compiles the number of reviews on the products "M1", "M2" and "M4" which are provided by the shop "Sh1" for each review poster. For example, three reviews by the review poster "AAA" are compiled. Likewise, the extracting unit 16 compiles the number of reviews for each of other review posters "BBB", "CCC" and the like. Then, the extracting unit 16 calculates the proportion of the number of reviews containing positive evaluations to the number of compiled reviews. For example, because there are three reviews containing positive evaluations (the evaluation value "5") from the review poster "AAA" on the product or the like provided by the shop "Sh1", the proportion to the number of compiled reviews is 100%.

When the specified proportion in the first correlation determination condition is 80%, for example, the extracting unit 16 determines that there is a correlation between the shop "Sh1" and the review poster "AAA". Specifically, it is highly possible that the review poster "AAA" is an interested party to the shop "Sh1".

Then, the extracting unit 16 sets a first extraction condition that, when it is determined that there is a correlation between a supplier of a product or the like and a review poster based on the first correlation determination condition, it is a review by the review poster on the product or the like provided by the supplier and then extracts the review that corresponds to the first extraction condition as the specific evaluation information. Specifically, the extracting unit 16 extracts the reviews posted by the review poster "AAA" on the product provided by the shop "Sh1" as the specific evaluation information. To be more specific, the extracting unit 16 extracts the posted reviews R1, R2 and R3 as the specific evaluation information.

Note that the extracting unit 16 may add, to the first correlation determination condition, a condition that the number of reviews containing positive evaluations by one review poster on each of a plurality of products or the like provided by one supplier is a specified number or more.

Note that, in the determination about a correlation between the shop "Sh1" and the review poster "AAA" described above, when the review poster "AAA" has posted a specified number or more of reviews on products or the like provided by suppliers different from the shop "Sh1", the extracting unit 16 may determine that there is no correlation between the shop "Sh1" and the review poster "AAA".

Further, the extracting unit 16 may further determine a correlation between a review poster and a review evaluator in the same manner based on the first correlation determination condition and set a first extraction condition that, when it is determined that there is a correlation, it is a review evaluation by the review evaluator on the review posted by the review poster and then extract the review evaluation that corresponds to the first extraction condition as the specific evaluation information. Specifically, the extracting unit 16 sets a first correlation determination condition that, based on a plurality of review evaluations that contain evaluations on reviews and that have been posted for the reviews, when the proportion of the number of review evaluations containing positive evaluations to the number of review evaluations by one review evaluator on a plurality of reviews provided by one review poster is a specified percentage or more, it is determined that there is a correlation between one review poster and one review evaluator.

The extracting unit 16 can determine a correlation between a review poster and a review evaluator by referring to the review history information shown in FIG. 4. Specifically, the extracting unit 16 compiles the number of review evaluations by the same review evaluator for one review poster for each review evaluator. For example, the extracting unit 16 compiles the number of review evaluations by the review evaluator "CCC" on the reviews posted by the review poster "AAA" and, as a result, three review evaluations (review evaluations on the reviews R1, R2 and R3) are compiled. Likewise, the extracting unit 16 compiles the number of review evaluations by another review evaluator "BBB" and, as a result, two review evaluations (review evaluations on the reviews R1 and R2) are compiled. Then, the extracting unit 16 calculates the proportion of the number of positive review evaluations to the number of review evaluations compiled for each review evaluator. For example, because there are three positive review evaluations (the evaluation contents: "P") among the three review evaluations by the review evaluator "CCC", the proportion is 100%.

When the specified proportion in the first correlation determination condition is 80%, for example, the extracting unit 16 determines that there is a correlation between the review poster "AAA" and the review evaluator "CCC". Specifically, it is highly possible that the review evaluator "CCC" is an interested party to the review poster "AAA".

Then, the extracting unit 16 sets a first extraction condition that, when it is determined that there is a correlation between a review poster and a review evaluator based on the first correlation determination condition, it is a review evaluation by the review evaluator on the review posted by the review poster and then extracts the review evaluation that corresponds to the first extraction condition as the specific evaluation information. Specifically, the extracting unit 16 extracts the review evaluations posted by the review evaluator "CCC" on the reviews posted by the review poster "AAA" as the specific evaluation information.

Note that the extracting unit 16 may add, to the first correlation determination condition, a condition that the number of positive review evaluations by one review evaluator on each of a plurality of reviews posted by one review poster is a specified number or more.

Note that, in the determination about a correlation between the review poster "AAA" and the review evaluator "CCC" described above, when the review evaluator "CCC" has made a specified number or more of review evaluations on reviews posted by review posters different from the review poster "AAA", the extracting unit 16 may determine that there is no correlation between the review poster "AAA" and the review evaluator "CCC".

Further, the extracting unit 16 may further determine a correlation between a supplier of a product, service or the like and a review evaluator in the same manner based on the first correlation determination condition and set a first extraction condition that, when it is determined that there is a correlation, it is a review evaluation by the review evaluator on a review for the product or the like provided by the supplier and then extract the review evaluation that corresponds to the first extraction condition as the specific evaluation information.

Positive review evaluations on positive reviews for a product or the like can be regarded as the evaluation information that positively evaluates the product or the like in an indirect manner. Then, the extracting unit 16 can set a first correlation determination condition that, when the proportion of the number of review evaluations containing positive evaluations to the number of review evaluations by one review evaluator on reviews containing positive evaluations for a plurality of products or the like provided by one supplier is a specified percentage or more, it is determined that there is a correlation between one supplier and one review evaluator. By setting the first correlation determination condition in this manner, it is possible to determine the possibility that the review evaluator is an interested party to the supplier of the product or the like. Note that the specified proportion in the first correlation determination condition may be set as 90%, for example, though not limited thereto.

Further, negative review evaluations on negative reviews for a product or the like can be regarded as the evaluation information that negatively evaluates the product or the like in an indirect manner. Then, the extracting unit 16 can add, to the first correlation determination condition, a condition that, when the proportion of the number of review evaluations containing negative evaluations to the number of review evaluations by one review evaluator on reviews containing negative evaluations for a plurality of products or the like provided by one supplier is a specified percentage or more, it is determined that there is a correlation between one supplier and one review evaluator.

Then, the extracting unit 16 may set a first extraction condition that, when it is determined that there is a correlation between a supplier of a product or the like and a review evaluator based on the first correlation determination condition, it is a review evaluation by the review evaluator on the product or the like provided by the supplier and then extract the review evaluation that corresponds to the first extraction condition as the specific evaluation information.

Note that the extracting unit 16 may add, to the first correlation determination condition, a condition that the number of evaluation information containing positive evaluations by one evaluator on reviews containing positive evaluations for a plurality of products or the like provided by one supplier is a specified number or more.

The extracting unit 16 may set a second correlation determination condition that, when the number of evaluation information containing positive evaluations on one evaluation target posted within a specified period of time from a reference time related to the evaluation target is a specified number or more, it is determined that there is a correlation between a supplier of one evaluation target and an evaluator of positive evaluation information, and set a second extraction condition that, as a result of determining the presence or absence of a correlation between a supplier and an evaluator based on the second correlation determination condition, when it is determined that there is a correlation between the supplier and the evaluator, it is evaluation information by the evaluator on the evaluation target provided by the supplier, and extract the evaluation information that further corresponds to the second extraction condition as the specific evaluation information.

Specifically, the extracting unit 16 may set a second correlation determination condition that, when the number of reviews containing positive evaluations on one product or the like which have been posted within a specified period of time from a specified reference time such as the sale date of the product or the like or the time when the posting of reviews becomes available is a specified number or more, it is determined that there is a correlation between a supplier of a product or the like and a poster of a positive review.

More specifically, the extracting unit 16 compiles the number of positive reviews that have been posted within a specified period of time from a specified reference time for each product as a review target by referring to the posted time $T_A$ of reviews in the review history information shown in FIG. 4. For example, the posted reviews with the evaluation value "5" are compiled as positive review evaluations. Then, when the number of positive reviews compiled for each product or the like is a specified number or more, the extracting unit 16 determines that there is a correlation between a supplier of the product or the like and a poster of the compiled posted reviews.

Then, the extracting unit 16 can set a second extraction condition that, when it is determined that there is a correlation between a supplier of a product or the like and a poster of a review, it is a review by the review poster on the product or the like provided by the supplier, and extract the review that corresponds to the first and second extraction conditions as the specific evaluation information.

Note that, in the second correlation determination condition, the specified period of time for compiling posted reviews based on the posted time $T_A$ may be "1 day", for example, though not limited thereto. Further, the specified number related to the number of posted reviews may be "10", for example, though not limited thereto.

Further, the extracting unit 16 may set a second correlation determination condition that, when the number of review evaluations containing positive evaluations on one review that have been posted within a specified period of time from a specified reference time such as the posted date of the review is a specified number or more, it is determined that there is a correlation between a review poster and an evaluator of positive review evaluations.

To be more specific, the extracting unit 16 compiles, for each posted review, the number of positive review evaluations that have been posted within a specified period of time from the posted time of the review by referring to the posted time $T_B$ of review evaluations in the review history information shown in FIG. 4. Then, when the number of compiled review evaluations is a specified number or more, the extracting unit 16 determines that there is a correlation between the review poster and the evaluator of the compiled review evaluations.

Then, the extracting unit 16 can set a second extraction condition that, when it is determined that there is a correlation between a review poster and a review evaluator, it is a review evaluation by the review evaluator on the review posted by the review poster, and extract the review evaluation that corresponds to the first and second extraction conditions as the specific evaluation information.

Further, when evaluation information that has been posted before the posting of one evaluation information by an evaluator of one evaluation information is not contained in a plurality of evaluation information, the extracting unit 16 may determine that the one evaluation information is evaluation information posted for the first time by the evaluator, and set a third correlation determination condition that, when the proportion of evaluation information posted for the first time by an evaluator to a plurality of evaluation information posted for one evaluation target is a specified percentage or more, it is determined that there is a correlation between a supplier of the one evaluation target and the evaluator of the evaluation information posted for the first time, and determines the presence or absence of a correlation between a supplier and an evaluator based on the third correlation determination condition. The extracting unit 16 may then set a third extraction condition that, when it is determined that there is a correlation between the supplier and the evaluator based on the third correlation determination condition, it is evaluation information by the evaluator on the evaluation target provided by the supplier, and extract the evaluation information corresponding to the first and third extraction conditions or corresponding to the first, second and third extraction conditions as the specific evaluation information.

Specifically, when a review that has been posted by a poster of one review before the posting of the one review is not contained in a plurality of reviews stored in the review history storing unit 12, the extracting unit 16 can determine that the one review is a review posted for the first time by the poster.

Further, when a review evaluation that has been posted by an evaluator of one review evaluation before the posting of the one review evaluation is not contained in a plurality of review evaluations stored in the review history storing unit 12, the extracting unit 16 can determine that the one review evaluation is a review evaluation posted for the first time by the evaluator.

Furthermore, the extracting unit 16 may set a third correlation determination condition that, when the proportion of reviews posted for the first time by a review poster to a plurality of reviews posted for one product or the like is a specified percentage or more, it is determined that there is a correlation between a supplier of the product or the like and the poster of the review posted for the first time.

More specifically, by referring to the review history information shown in FIG. 4, when a poster of one review has not posted any review other than the one review, or when the posted time $T_A$ of all reviews other than the one review by a poster of the one review is after the posted time $T_A$ of the one review, the extracting unit 16 can determine that the one review is a review posted for the first time by the poster. Then, the extracting unit 16 compiles the number of posted reviews determined as the ones posted for the first time, and when the proportion of reviews posted for the first time by the review poster to the reviews posted for one product or the like is a specified percentage or more, the extracting unit 16 can determine that there is a correlation between a supplier of the product or the like and the review poster of the reviews compiled as the ones posted for the first time by the review poster for the product. Note that the specified proportion related to the number of posted reviews may be "50%", for example, though not limited thereto.

Then, the extracting unit 16 can set a third extraction condition that, when it is determined that there is a correlation between a supplier of a product or the like and a review poster, it is a review by the review poster on the product or the like provided by the supplier, and extract the review that corresponds to the first and third extraction conditions or corresponds to the first, second and third extraction conditions as the specific evaluation information.

Note that the extracting unit 16 may acquire the date and time when the posting of a review by a review poster becomes available from the user information storing unit 15, and add, to the third correlation determination condition, a condition that the period of time from the date and time when the posting becomes available to the posted time $T_A$ is a specified period of time or less. The specified period of time may be "1 day", for example, though not limited thereto.

Further, the extracting unit 16 may set a third correlation determination condition that, when the proportion of review evaluations posted for the first time by a review evaluator to a plurality of review evaluations posted for one review is a specified percentage or more, it is determined that there is a correlation between the review poster and the evaluator of a review evaluation posted for the first time.

More specifically, by referring to the review history information shown in FIG. 4, when an evaluator of one review evaluation has not posted any review evaluation other than the one review evaluation, or when the evaluation time $T_A$ of all review evaluations other than the one review evaluation by an evaluator of the one review evaluation is after the posted time $T_B$ of the one review evaluation, the extracting unit 16 can determine that the one review evaluation is the first review evaluation by the evaluator. Then, the extracting unit 16 compiles the number of review evaluations determined as the review evaluations posted for the first time and, when the proportion of review evaluations posted for the first time by the review evaluator to the review evaluations on one review is a specified percentage or more, the extracting unit 16 can determine that there is a correlation between the review poster and the evaluator of the review evaluations compiled as the ones posted for the first time by the review evaluator on the review. Note that the specified proportion related to the number of review evaluations may be "50%", for example, though not limited thereto.

Then, the extracting unit 16 can set a third extraction condition that, when it is determined that there is a correlation between a review poster and a review evaluator, it is a review evaluation by the review evaluator on the review posted by the poster, and extract the review evaluation that corresponds to the first and third extraction conditions or corresponds to the first, second and third extraction conditions as the specific evaluation information.

Note that the extracting unit 16 may acquire the date and time when the posting of a review evaluation by a review evaluator becomes available from the user information storing unit 15, and add, to the third correlation determination condition, a condition that the period of time from the date and time when the posting of a review evaluation becomes available to the posted time $T_B$ is a specified period of time or less.

The outputting unit 17 is a part that executes specified processing based on the specific evaluation information extracted by the extracting unit 16. Specifically, the outputting unit 17 displays the specific evaluation information extracted by the extracting unit 16 on the review presenting unit 13 in such a way that it is distinguishable from the evaluation information other than the specific evaluation information. Further, the outputting unit 17 can display the proportion of the number of the specific evaluation information to the number of evaluation information posted for one evaluation target on the review presenting unit 13.

Figure 7:
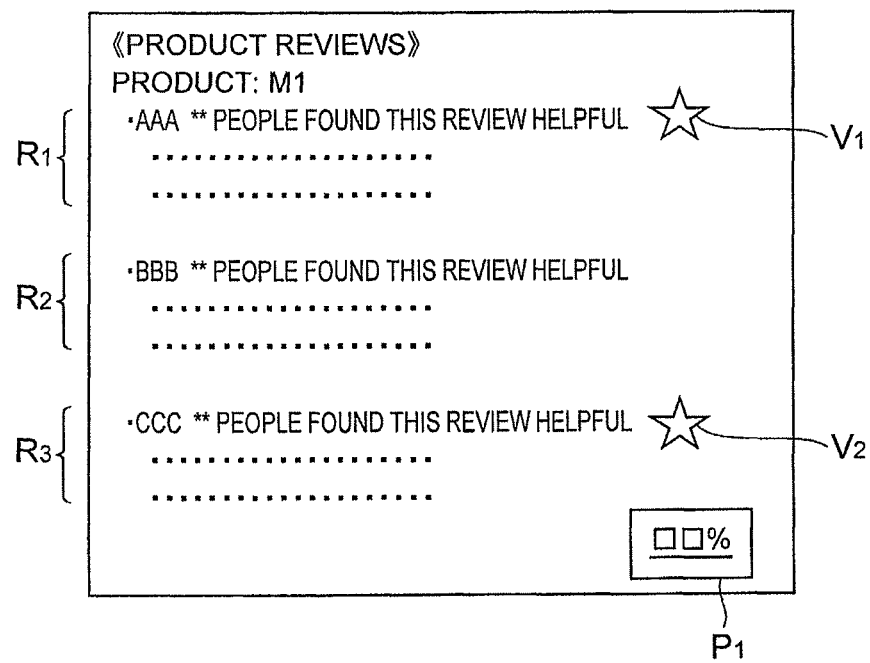
FIG. 7 is an example of a display screen for posted reviews or the like which is displayed so that specific evaluation information is distinguishable.

FIG. 7 is an example of a display screen for posted reviews or the like which is displayed by the review presenting unit 13. As shown in FIG. 7, the review presenting unit 13 displays the reviews $R_1$, $R_2$ and $R_3$ on the product M1. When the reviews posted by the review posters "AAA" and "CCC" are the specific evaluation information, the outputting unit 17 displays marks $V_1$ and $V_2$ for identifying the specific evaluation information in association with the reviews $R_1$ and $R_3$, respectively, for example. Further, the outputting unit 17 calculates the proportion of the number of reviews corresponding to the specific evaluation information to the reviews on the product M1 and displays the calculated value as indicated by the symbol $P_1$.

Figure 8:
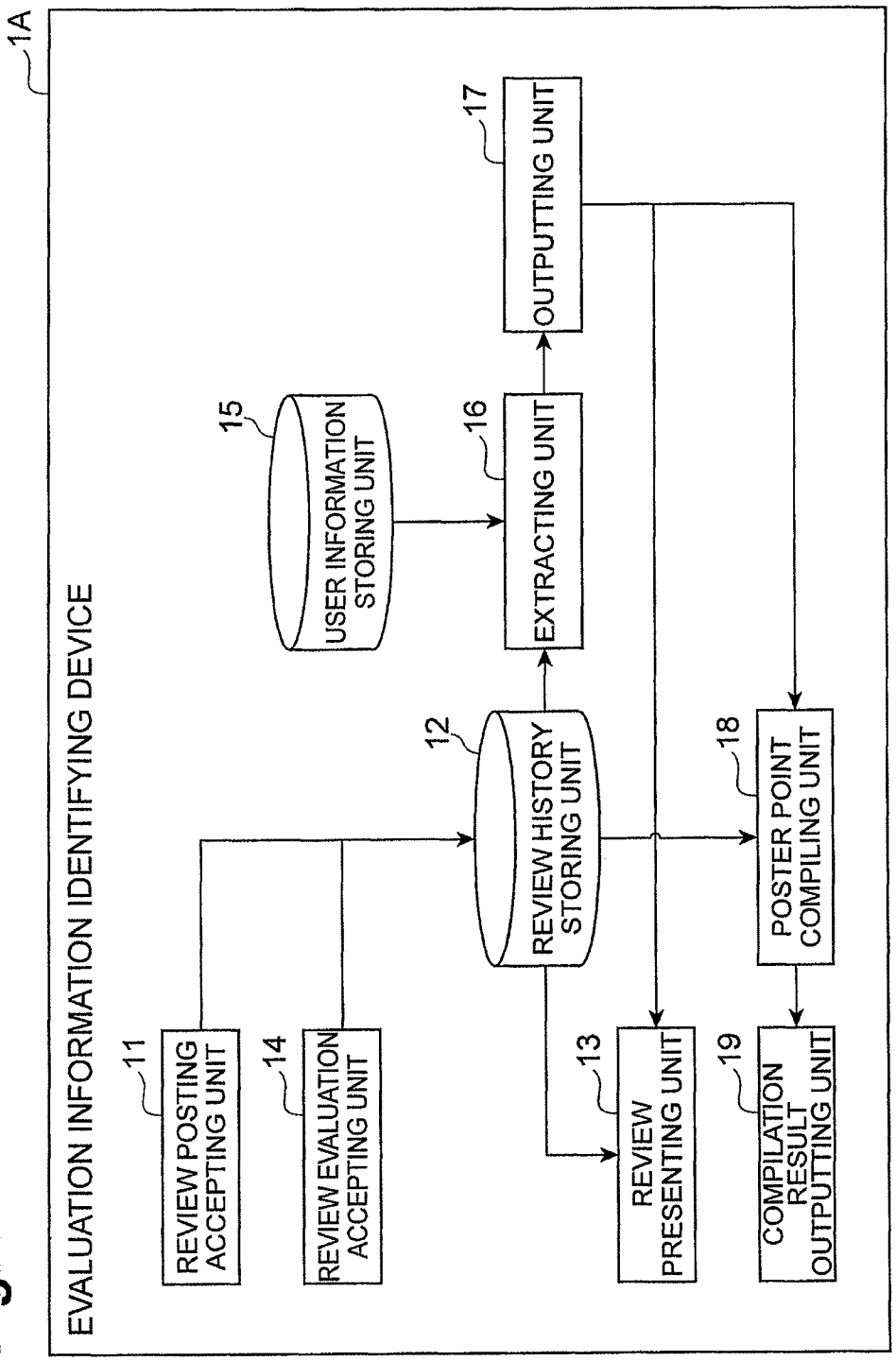
FIG. 8 is a block diagram showing a functional configuration of an evaluation information identifying device including components for executing specified processing in an outputting unit.
Figure 9:
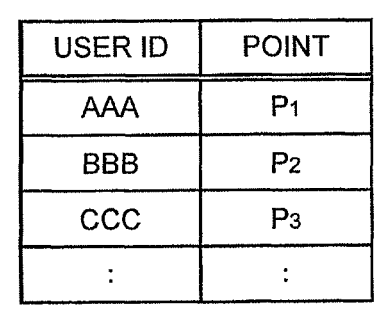
Figure 10:
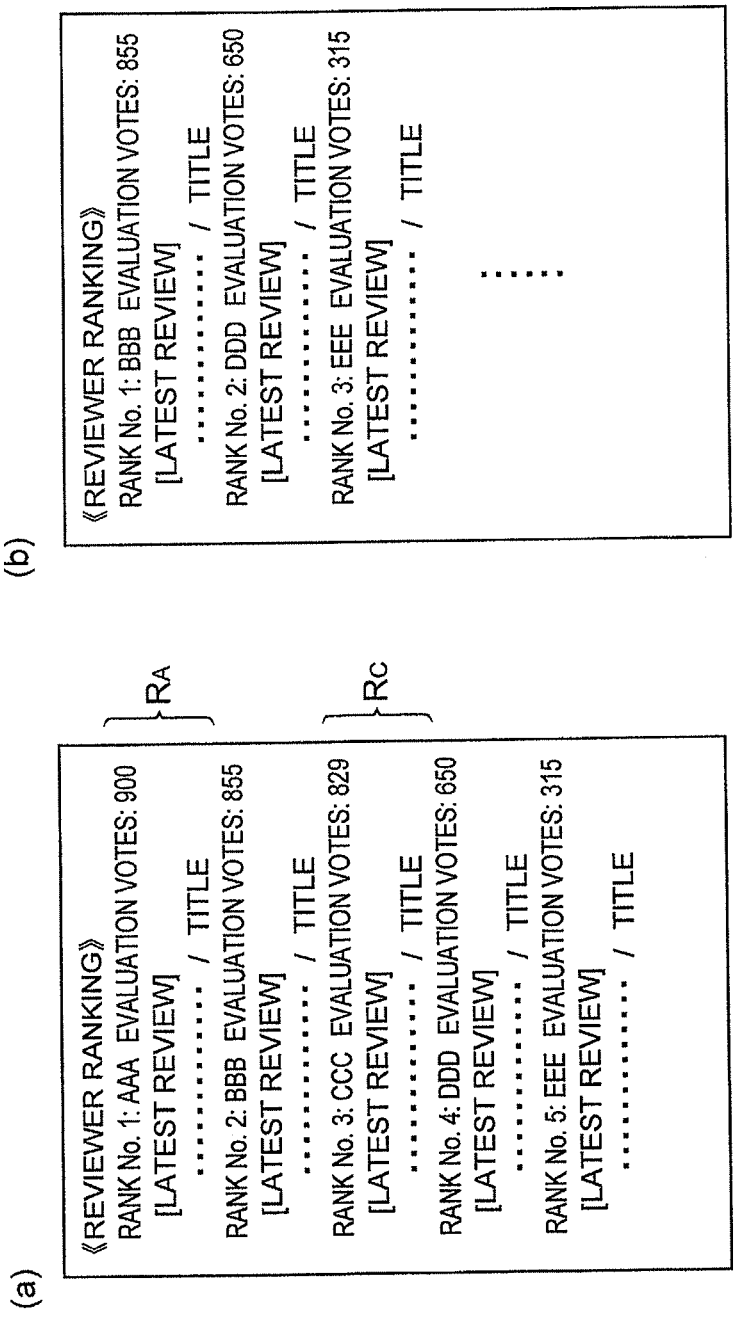
FIG. 10 is a diagram showing an example of a display screen for ranking based on points.

Specified processing executed by the outputting unit 17 is described hereinafter with reference to FIGS. 8 to 10. FIG. 8 is a block diagram showing the functional configuration of an evaluation information identifying device 1A including components for executing the specified processing. The functional units 11 to 16 in the block diagram of FIG. 8 have the same functions as the functional units 11 to 16 in the block diagram of FIG. 2. The evaluation information identifying device 1A includes a poster point compiling unit 18 (compiling means) and a compilation result outputting unit 19 in addition to the functional units 11 to 16 and the outputting unit 17.

The poster point compiling unit 18 is a part that gives points to an evaluator of evaluation information based on the number of posted evaluation information and the level of evaluations on the evaluation information. Specifically, the poster point compiling unit 18 gives points to a review poster based on the number of posted reviews and review evaluations on the posted reviews and stores the total of points for each user ID of the review poster. FIG. 9 is a diagram showing an example of a point table that stores points in association with each user in the poster point compiling unit 18. As shown in FIG. 9, the point table stores "$P_1$" to "$P_3$" as the points of the users "AAA" to "CCC", respectively.

The outputting unit 17 can cause the poster point compiling unit 18 to give points in accordance with the proportion of the number of specific evaluation information to the number of reviews posted for one product or the like to a review poster who has posted reviews on the product or the like. Specifically, as the number of specific evaluation information out of the number of reviews posted for a product or the like is larger, the outputting unit 17 controls the poster point compiling unit 18 to give higher points to a poster when the poster who is not an interested party to the product or the like posts a review on the product or the like. It is thereby possible to promote the posting of evaluation information by those who are not an interested party to an evaluation target by giving points as incentives, which enhances the reliability of the evaluation information on the evaluation target.

Further, the poster point compiling unit 18 can output the ranking of review posters according to points based on the points that have been given to the review posters. Then, the compilation result outputting unit 19 displays the ranking that is output by the poster point compiling unit 18 on a specified display means such as a display of the terminal T, for example. For example, the compilation result outputting unit 19 transmits data for displaying the details of the ranking on a Web page or the like to the terminals T through the network N.

In this case, the outputting unit 17 controls the points given to an evaluator of specific evaluation information to be lower than the points given to an evaluator of evaluation information other than the specific evaluation information, or excludes an evaluator of specific evaluation information from the compilation of the ranking. Specifically, the outputting unit 17 controls the poster point compiling unit 18 so that points from which certain points are subtracted or which are reduced by a certain factor from specified points given to a general evaluator other than an evaluator of specific evaluation information are given to the evaluator of the specific evaluation information.

Further, the outputting unit 17 acquires a user ID of an evaluator of specific evaluation information extracted by the extracting unit 16 and controls the poster point compiling unit 18 so that the user is excluded from the compilation of the ranking based on the points. FIG. 10 is a diagram showing an example of a display screen for ranking based on points. FIG. 10(a) is an example of a ranking list in which control by the outputting unit 17 is not made, and the review posters "AAA" to "EEE" are respectively ranked in the first to fifth places. In the case where the review posters "AAA" and "CCC" are evaluators of specific evaluation information, for example, the ranking display $R_A$ of the review poster "AAA" and the ranking display $R_C$ of the review poster "CCC" are excluded from the ranking as shown in FIG. 10(b). The reliability of the ranking of review posters is thereby enhanced.

Figure 11:
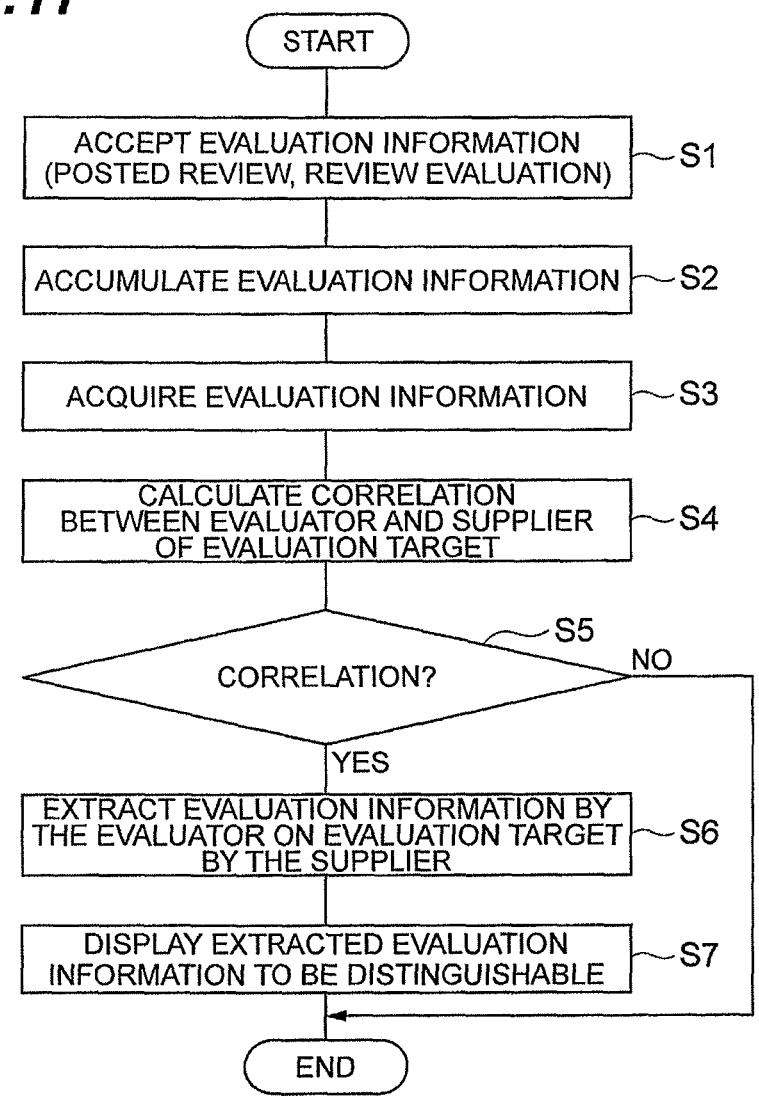
FIG. 11 is a flowchart showing a process in an evaluation information identifying device.

The operation of the evaluation information identifying device 1 according to this embodiment is described hereinafter with reference to FIG. 11. FIG. 11 is a flowchart showing a process of an evaluation information identifying method which is performed in the evaluation information identifying device 1.

First, the review posting accepting unit 11 accepts the posting of reviews on products, services and the like as the evaluation target (S1). Alternatively, the review evaluation accepting unit 14 accepts review evaluations containing evaluations on the posted reviews as evaluation information (S1). Then, the review history storing unit 12 accumulates the posted reviews accepted by the review posting accepting unit 11 or the review evaluations accepted by the review evaluation accepting unit 14 (S2).

Next, the extracting unit 16 acquires the posted reviews or review evaluations from the review history storing unit 12 (S3). The extracting unit 16 then calculates a correlation between the poster of the review (evaluator) and the supplier of the product or the like as the target of the review (evaluation target) (S4). Alternatively, the extracting unit 16 calculates a correlation between the evaluator of the review evaluation (evaluator) and the poster of the posted review (supplier) (S4). The extracting unit 16 then determines whether there is a correlation between the evaluator and the supplier of the evaluation target (S5). When it is determined that there is a correlation, the process proceeds to Step S6. On the other hand, when it is not determined that there is a correlation, the process ends.

In Step S6, the extracting unit 16 extracts the review (evaluation information) posted by the review poster on the product or the like provided by the supplier, regarding the supplier of the product or the like and the review poster determined to have a correlation, as the specific evaluation information (S6). Alternatively, the extracting unit 16 extracts the review evaluation (evaluation information) by the review evaluator on the review posted by the review poster, regarding the review poster and the review evaluator determined to have a correlation, as the specific evaluation information (S6). Then, the outputting unit 17 displays the specific evaluation information extracted by the extracting unit 16 on the review presenting unit 13 in such a way that it is distinguishable from the evaluation information other than the specific evaluation information (S7).

Note that the processing of Steps S1 to S2 is performed each time the posting of a review or a review evaluation is accepted. Further, the processing of Steps S3 to S7 is performed at arbitrary timing and, for example, may be performed each time a specified time is elapsed or reached (batch processing).

Figure 12:
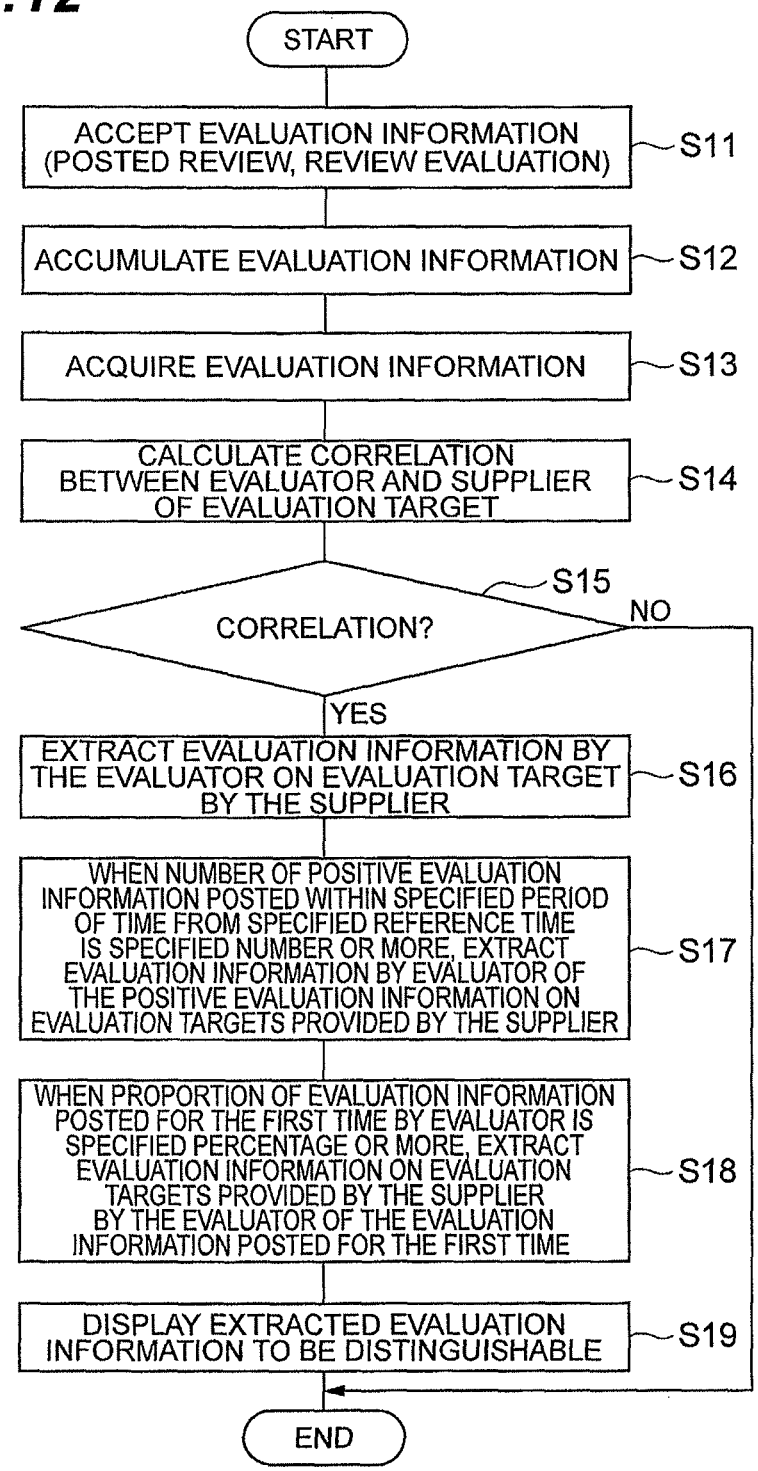
FIG. 12 is a flowchart showing a process in an evaluation information identifying device.

Next, another example of a process which is performed in the evaluation information identifying device 1 according to this embodiment is described hereinafter with reference to FIG. 12. The processing of Steps S11 to S16 is the same as the processing of Steps S1 to S6 shown in the flowchart of FIG. 11. In the following Step S17, when the number of evaluation information containing positive evaluations which have been posted within a specified period of time from a specified reference time for the evaluation target is a specified number or more, the extracting unit 16 determines that there is a correlation between an evaluator of the evaluation information containing positive evaluations and a supplier of the evaluation target and extracts the evaluation information by the evaluator on the evaluation target from the supplier from the evaluation information extracted in Steps S16 (S17).

Further, when the proportion of evaluation information posted for the first time by an evaluator to a plurality of evaluation information posted for one evaluation target is a specified percentage or more, the extracting unit 16 determines that there is a correlation between the evaluator of the evaluation information posted for the first time and a supplier of the evaluation target, and extracts the evaluation information by the evaluator on the evaluation target from the supplier from the evaluation information extracted in Step S17 (S18). Then, the outputting unit 17 displays the evaluation information extracted in Step S17 as the specific evaluation information on the review presenting unit 13 in such a way that it is distinguishable from the evaluation information other than the specific evaluation information (S19). Note that, in the flowchart of FIG. 12, either one processing of Steps S17 and S18 may be not performed.

Figure 13:
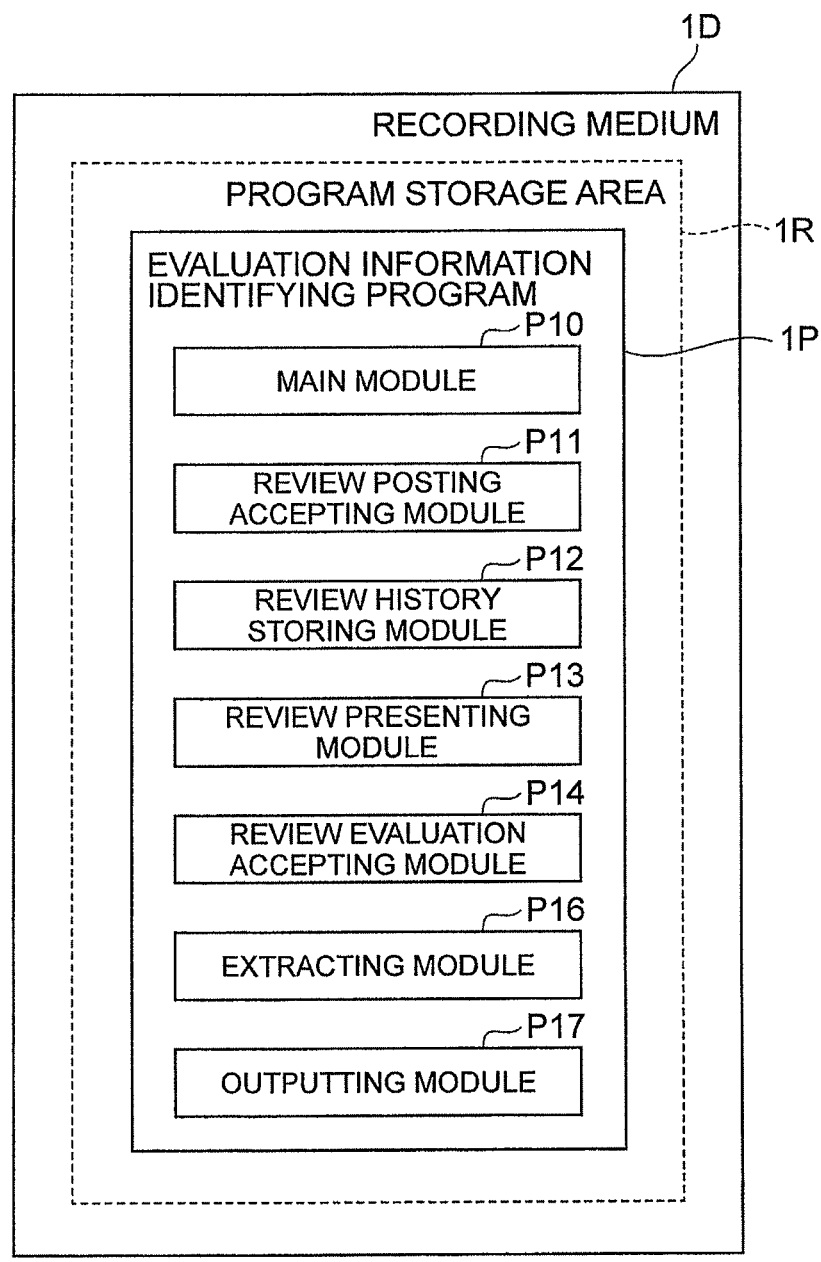
FIG. 13 is a diagram showing a structure of an evaluation information identifying program.

An evaluation information identifying program that causes a computer to function as the evaluation information identifying device 1 is described hereinafter with reference to FIG. 13.

An evaluation information identifying program 1P includes a main module P10, a review posting accepting module P11, a review history storing module P12, a review presenting module P13, a review evaluation accepting module P14, an extracting module P16, and an outputting module P17.

The main module P10 is a part that exercises control over the evaluation information identifying device 1. The functions implemented by executing the review posting accepting module P11, the review history storing module P12, the review presenting module P13, the review evaluation accepting module P14, the extracting module P16, and the outputting module P17 are equal to the functions of the review posting accepting unit 11, the review history storing unit 12, the review presenting unit 13, the review evaluation accepting unit 14, the extracting unit 16 and the outputting unit 17 shown in FIG. 2, respectively.

The evaluation information identifying program 1P is provided through a storage medium such as CD-ROM or DVD-ROM or semiconductor memory, for example. Further, the evaluation information identifying program 1P may be provided as a computer data signal superimposed onto a carrier wave over a communication network.

In the evaluation information identifying device 1, the evaluation information identifying method, and the evaluation information identifying program 1P according to this embodiment described above, because the presence or absence of a correlation between a supplier of an evaluation target and an evaluator who has evaluated the evaluation target is determined based on the proportion of the number of evaluation information containing positive evaluations to the number of evaluation information by one evaluator on a plurality of evaluation targets supplied by one supplier, it is determined by the extracting unit 16 whether the possibility that the evaluator is an interested party to the supplier is high or low. Then, when it is determined that there is a correlation, the evaluation information posted by the evaluator on the evaluation target provided by the supplier is extracted as the specific evaluation information by the extracting unit 16, and specified processing based on the extracted specific evaluation information is executed by the outputting unit 17, so that the evaluation information by an interested party to the evaluation target or the like, which is not useful for users, is identified. It is thereby possible to provide useful evaluation information.

The embodiments of the present invention are described in detail above. However, the present invention is not restricted to the above-described embodiments, and various changes and modifications may be made without departing from the scope of the invention.

INDUSTRIAL APPLICABILITY

As described above, according to the embodiments, there is provided an evaluation information identifying device that can identify evaluation information by an interested party to an evaluation target or the like.

REFERENCE SIGNS LIST

1 . . . evaluation information identifying device, 1A . . . evaluation information identifying device, 11 . . . review posting accepting unit, 12 . . . review history storing unit, 13 . . . review presenting unit, 14 . . . review evaluation accepting unit, 15 . . . user information storing unit, 16 . . . extracting unit, 17 . . . outputting unit, 18 . . . poster point compiling unit, 19 . . . compilation result outputting unit, 100 . . . system, 1D . . . storage medium, 1P . . . evaluation information identifying program, P10 . . . main module, P11 . . . review posting accepting module, P12 . . . review history storing module, P13 . . . review presenting module, P14 . . . review evaluation accepting module, P16 . . . extracting module, P17 . . . outputting module

The invention claimed is:

1. An evaluation information identifying device which receives reviews on evaluation targets from a plurality of user terminals through an Internet network, the evaluation information identifying device comprising:

at least one memory operable to store program code;

at least one processor operable to read the program code and operate as instructed by the program code, the program code configured to cause the at least one processor to:

transmit a screen data for displaying posted reviews related to an evaluation target provided by a supplier to a user terminal;

accept review evaluations containing evaluations on the posted reviews as evaluation information from the user terminal based on a user input on a screen on the user terminal, the screen being generated based on the transmitted screen data;

store a user identification (ID) of a review evaluator and contents of evaluation in association with each other;

set a first correlation determination condition that, based on a plurality of evaluation information containing evaluations by evaluators on the evaluation target provided by the supplier and posted for the evaluation target through the Internet network, when a proportion of a number of evaluation information containing positive evaluations by one evaluator on a plurality of evaluation targets provided by one supplier to a total number of evaluation information by the one evaluator on the plurality of evaluation targets provided by the one supplier is a specified percentage or more, it is determined that there is a correlation between the one supplier and the one evaluator, and determine presence or absence of a correlation between a supplier and an evaluator based on the first correlation determination condition;

set a first extraction condition that, when it is determined that there is a correlation between the supplier and the evaluator based on the first correlation determination condition, evaluation information corresponds to evaluation information by the evaluator on the evaluation target provided by the supplier, and extract the evaluation information corresponding to the first extraction condition as specific evaluation information;

calculate a ratio of a number of the specific evaluation information associated with one evaluation target to a number of evaluation information posted for the one evaluation target;

perform specified processing on the specific evaluation information and, when a second screen data for displaying posted reviews related to the evaluation target, including the specific evaluation information, is transmitted, control the specific evaluation information on which the specified processing is performed to be displayed on a second screen on a second user terminal, the second screen being generated based on the second screen data; and control the second screen data to include information including the calculated ratio to be displayed on the second screen on the second user terminal.

2. The evaluation information identifying device according to claim 1, wherein the program code further configured to cause the at least one processor to:

set a second correlation determination condition that, when a number of evaluation information containing positive evaluations on one evaluation target posted within a specified period of time from a reference time related to the evaluation target is a specified number or more, it is determined that there is a correlation between a supplier of the one evaluation target and an evaluator of the positive evaluation information, and determine presence or absence of a correlation between a supplier and an evaluator based on the second correlation determination condition; and set a second extraction condition that, when it is determined that there is a correlation between the supplier and the evaluator based on the second correlation determination condition, evaluation information corresponds to evaluation information by the evaluator on the evaluation target provided by the supplier, and extract the evaluation information further corresponding to the second extraction condition as the specific evaluation information.

3. The evaluation information identifying device according to claim 1, wherein the evaluation information contains information about a posted time, and wherein the program code further configured to cause the at least one processor to:

when evaluation information having been posted before the posted time of one evaluation information by an evaluator of the one evaluation information is not contained in the plurality of evaluation information, determine that the one evaluation information is evaluation information posted for the first time by the evaluator, set a third correlation determination condition that, when a proportion of evaluation information posted for the first time by an evaluator to a plurality of evaluation information posted for one evaluation target is a specified percentage or more, it is determined that there is a correlation between a supplier of the one evaluation target and the evaluator of the evaluation information posted for the first time, and determine presence or absence of a correlation between a supplier and an evaluator based on the third correlation determination condition, and set a third extraction condition that, when it is determined that there is a correlation between the supplier and the evaluator based on the third correlation determination condition, evaluation information corresponds to evaluation information by the evaluator on the evaluation target provided by the supplier, and extract the evaluation information further corresponding to the third extraction condition as the specific evaluation information.

4. The evaluation information identifying device according to claim 3, wherein the program code further configured to cause the at least one processor to set a third correlation determination condition that, when a proportion of evaluation information posted for the first time by an evaluator and posted within a specified period of time from date and time when posting of evaluation information by the evaluator becomes available to a plurality of evaluation information posted for one evaluation target is a specified percentage or more, it is determined that there is a correlation between a supplier of the one evaluation target and the evaluator of the evaluation information posted for the first time.

5. The evaluation information identifying device according to claim 1, wherein the program code further configured to cause the at least one processor to set a first correlation determination condition that, when a proportion of a number of evaluation information containing positive evaluations to a number of evaluation information by one evaluator on a plurality of evaluation targets provided by one supplier is a specified percentage or more and the number of evaluation information containing positive evaluations is a specified number or more, it is determined that there is a correlation between the one supplier and the one evaluator.

6. The evaluation information identifying device according to claim 1, wherein when a specified number or more of evaluation information are posted by the evaluator for evaluation targets provided by suppliers other than the supplier, it is determined that there is no correlation between the supplier and the evaluator.

7. The evaluation information identifying device according to claim 1, wherein the evaluation target is a specified product or service, the evaluation information is a review containing an evaluation on the specified product or service, and the evaluator is a review poster having posted the review.

8. The evaluation information identifying device according to claim 1, wherein the evaluation target is a review posted for a specified product or service, the supplier of the evaluation target is a review poster having posted the review, the evaluation information is information containing a review evaluation on the review, and the evaluator is a poster of the review evaluation.

9. The evaluation information identifying device according to claim 1, wherein
the evaluation target is a specified product or service,
the evaluation information is a review evaluation on a review posted for the evaluation target,
the evaluator is a poster of the review evaluation, and
the program code further configured to cause the at least one processor to set a first correlation determination condition that, when a proportion of a number of evaluation information containing positive evaluations to a number of evaluation information by one evaluator on reviews containing positive evaluations for one or more evaluation targets provided by one supplier is a specified percentage or more, it is determined that there is a correlation between the one supplier and the one evaluator.

10. The evaluation information identifying device according to claim 1, wherein
the program code further configured to cause the at least one processor to display the extracted specific evaluation information on the second screen on the user terminal so as to be distinguishable from evaluation information other than the specific evaluation information.

11. The evaluation information identifying device according to claim 1, wherein the program code further configured to cause the at least one processor to:
give points to an evaluator of evaluation information based on a number of posted evaluation information and a level of evaluation on the evaluation information; and
give points in accordance with a proportion of a number of the specific evaluation information to a number of evaluation information posted for one evaluation target to an evaluator having posted evaluation information on the one evaluation target.

12. The evaluation information identifying device according to claim 1, wherein the program code further configured to cause the at least one processor to:
give points to an evaluator of evaluation information based on a number of posted evaluation information and a level of evaluation on the evaluation information and outputting ranking of evaluators based on the points,
control points given to an evaluator of the specific evaluation information to be lower than points given to an evaluator of evaluation information other than the specific evaluation information, or exclude an evaluator of the specific evaluation information from compilation of the ranking.

13. An evaluation information identifying method performed by an evaluation information identifying device including at least one processor and communicating with a plurality of user terminals through an Internet network to receive reviews on evaluation targets, the method comprising:
transmitting a screen data for displaying posted reviews related to an evaluation target provided by a supplier to a user terminal;
accepting review evaluations containing evaluations on the posted reviews as evaluation information from the user terminal based on a user input on a screen on the user terminal, the screen being generated based on the transmitted screen data, wherein a user identification (ID) of a review evaluator and contents of evaluation are stored in association with each other in the evaluation information identifying device;
setting, using the at least one processor, a first correlation determination condition that, based on a plurality of evaluation information containing evaluations by evaluators on the evaluation target provided by the supplier and posted for the evaluation target through the Internet network, when a proportion of a number of evaluation information containing positive evaluations by one evaluator on a plurality of evaluation targets provided by one supplier to a total number of evaluation information by the one evaluator on the plurality of evaluation targets provided by the one supplier is a specified percentage or more, it is determined that there is a correlation between the one supplier and the one evaluator, and determining, using the at least one processor, presence or absence of a correlation between a supplier and an evaluator based on the first correlation determination condition;
setting, using the at least one processor, a first extraction condition that, when it is determined that there is a correlation between the supplier and the evaluator based on the first correlation determination condition, evaluation information corresponds to evaluation information by the evaluator on the evaluation target provided by the supplier, and extracting, using the at least one processor, the evaluation information corresponding to the first extraction condition as specific evaluation information;
calculating a ratio of a number of the specific evaluation information associated with one evaluation target to a number of evaluation information posted for the one evaluation target; and
performing, using the at least one processor, specified processing on the extracted specific evaluation information and, when a second screen data for displaying posted reviews related to the evaluation target, including the specific evaluation information, is transmitted, displaying the specific evaluation information on which the specified processing is performed on a second screen on a second user terminal, the second screen being generated based on the second screen data,
wherein the displaying comprises displaying information including the calculated ratio on the second screen on the second user terminal.

14. A computer readable recording medium for recording an evaluation information identifying program causing a computer to:
transmit a screen data for displaying posted reviews related to an evaluation target provided by a supplier to a user terminal;
accept review evaluations containing evaluations on the posted reviews as evaluation information from the user terminal based on a user input on a screen on the user terminal, the screen being generated based on the transmitted screen data;
store a user identification (ID) of a review evaluator and contents of evaluation in association with each other;
set a first correlation determination condition that, based on a plurality of evaluation information containing evaluations by evaluators on the evaluation target provided by the supplier and posted for the evaluation target, when a proportion of a number of evaluation information containing positive evaluations by one evaluator on a plurality of evaluation targets provided by one supplier to a total number of evaluation information by the one evaluator on the plurality of evaluation targets provided by the one supplier is a specified percentage or more, it is determined that there is a correlation between the one supplier and the one evaluator, and determine presence or absence of a correlation between a supplier and an evaluator based on the first correlation determination condition;

set a first extraction condition that, when it is determined that there is a correlation between the supplier and the evaluator based on the first correlation determination condition, evaluation information corresponds to evaluation information by the evaluator on the evaluation target provided by the supplier, and extract the evaluation information corresponding to the first extraction condition as specific evaluation information;

calculate a ratio of a number of the specific evaluation information associated with one evaluation target to a number of evaluation information posted for the one evaluation target;

perform specified processing on the extracted specific evaluation information extracted and, when a second screen data for displaying posted reviews related to the evaluation target, including the specific evaluation information, is transmitted, displaying the specific evaluation information on which the specified processing is performed on a second screen on a second user terminal, the second screen being generated based on the transmitted second screen data; and display information including the calculated ratio on the second screen on the second user terminal.

* * * * *